(12) United States Patent
Lee et al.

(10) Patent No.: US 8,032,534 B2
(45) Date of Patent: Oct. 4, 2011

(54) METHOD AND SYSTEM FOR INDEXING AND SEARCHING HIGH-DIMENSIONAL DATA USING SIGNATURE FILE

(75) Inventors: Hun-Soon Lee, DaeJeon (KR); Mi-Young Lee, DaeJeon (KR); Myung-Joon Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 602 days.

(21) Appl. No.: 12/107,419

(22) Filed: Apr. 22, 2008

(65) Prior Publication Data

US 2009/0157601 A1    Jun. 18, 2009

(30) Foreign Application Priority Data

Dec. 17, 2007 (KR) .................. 10-2007-0132582

(51) Int. Cl.
*G06F 17/30* (2006.01)
(52) U.S. Cl. ........................................................ 707/747
(58) Field of Classification Search ................ 707/747
See application file for complete search history.

(56) References Cited

U.S. PATENT DOCUMENTS

| 5,832,131 A * | 11/1998 | Choo et al. ............... 382/253 |
| 7,167,574 B2 * | 1/2007 | Kim ............................. 382/100 |
| 2006/0253491 A1 * | 11/2006 | Gokturk et al. ............ 707/104.1 |
| 2006/0268298 A1 * | 11/2006 | Wali et al. .................. 358/1.9 |
| 2008/0065606 A1 * | 3/2008 | Boys et al. ................. 707/3 |

FOREIGN PATENT DOCUMENTS

| JP | 2005-071115 | 3/2005 |
| JP | 2008-009859 | 1/2008 |
| KR | 10-2001-0075871 | 8/2001 |
| KR | 2003-0006638 | 1/2003 |

OTHER PUBLICATIONS

Stefan Berchtold et al., "The X-tree: An Index Structure for High-Dimensional Data", Proceedings of the 22$^{nd}$ VLDB Conference Mumbai (Bombay), India, 1996, pp. 28-39.

* cited by examiner

*Primary Examiner* — James Trujillo
*Assistant Examiner* — William Spieler
(74) *Attorney, Agent, or Firm* — Staas & Halsey LLP

(57) ABSTRACT

Provided are a content-based searching method and system for multimedia objects using a high-dimensional feature vector data based on a 2-level signature. The method for searching the high-dimensional data using a signature file includes calculating a first-level query signature and a second-level query signature by using the query feature vector, performing a first filtering operation to obtain a primary candidate cell group by searching a second-level signature file, and performing a secondary filtering operation to obtain a secondary candidate cell group having a high similarity in a primary candidate cell group. Accordingly, the high-dimensional data searching method and system can process a query quickly and accurately and can increase the searching accuracy by using an enhanced signature of the query feature vector.

10 Claims, 7 Drawing Sheets

N : DIMENSION OF FEATURE VECTOR
Fi : i-th DIMENSIONAL FEATURE VECTOR VALUE
    ( $0.0 \leq F_i < 1.0$ )
Si : i-th DIMENSIONAL SIGNATURE
b : BIT NUMBER OF SIGNATURE
[ x ] : ROUNDING DOWN X BELOW DECIMAL PLACE

FIG. 7

FEATURE VECTOR ( 0.124, 0.352, 0.314, 0.5, 0.435, 0.754 )

| $F_i$ | $S_i$ | $L(S_i)$ | $U(S_i)$ | $S^c_i$ |
|---|---|---|---|---|
| 0.124 | 0001 | 0001 | 0001 | 0001 |
| 0.352 | 0101 | 0101 | 0101 | 0101 |
| 0.314 | 0101 | 0101 | 0101 | 0101 |
| 0.5 | 1000 | 0111 | 1000 | 0111, 1000 |
| 0.435 | 0110 | 0110 | 0110 | 0110 |

METHOD AND SYSTEM FOR INDEXING AND SEARCHING HIGH-DIMENSIONAL DATA USING SIGNATURE FILE

CROSS-REFERENCE TO RELATED APPLICATIONS

This application claims priority under 35 U.S.C. §119 to Korean Patent Application No. P2007-132582, filed on Dec. 17, 2007, the disclosure of which is incorporated herein by reference in its entirety.

BACKGROUND OF THE INVENTION

1. Field of the Invention

The present disclosure relates to a content-based searching method and system for multimedia objects using high-dimensional feature vector data, which are capable of quickly and exactly processing a query with a 2-level signature.

2. Description of the Related Art

Due to developments of computing and media technologies, data are represented in a type of a multimedia including texts, images, audios, and videos. A searching efficiency is a major issue in handling such multimedia information. That is, the major issue is how quickly and exactly a user can search multimedia data containing desired information. A content-based searching method using an extracted high-dimensional feature vector data is generally used for searching data from multimedia objects, such as images, audios, and videos.

In the content-based searching method for such multimedia objects, there are two representative query types, that is, a range query and a k-nearest neighbor query.

The range query is a query for finding multimedia objects satisfying a similarity with a certain range, and the k-nearest neighbor query is a query for finding the k number of objects with a high similarity. In these query, the calculation of the similarity is generally achieved by a method for calculating Euclidean distance.

In order to ensure the fast searching of high-dimensional data, it is important to reduce the calculation of the similarity and the data read. To this end, high-dimensional data indexing schemes have been used, which may be proposed by being largely classified into a tree-based indexing scheme and a filtering-based indexing scheme.

In order to efficiently search objects distributed in a data space, the tree-based indexing scheme (e.g., R-Tree, X-Tree, SR-Tree, M-Tree, etc.) uses rectangles or circles indicating a group of neighbor objects as a searching unit. However, since an overlapping area between the rectangles or the circles, which indicate the group of the neighbor objects, is expanded as data dimension increase, there is raised the curse of dimension problem that the searching performance may be lower than that of a sequential searching by exponentially degrading. Therefore, there is a need for a method and system that can solve the curse of dimension problem.

The filtering-based indexing scheme (e.g., VA-File, CBF, etc.) is to improve the searching performance for high-dimensional data by using signatures and feature vectors, which is a method that sequentially reads all signature files to primarily filter them and thereafter reads the feature vectors.

The filtering-based indexing scheme has a disadvantage that accuracy is lowered when decreasing the bit size of the signature, and that data intended to be read increase when increasing the bit size of the signature.

SUMMARY

Therefore, an object of the present invention is to provide a content-based searching method and system for multimedia objects, which are capable of quickly and exactly processing a user's query using high-dimensional feature vector data.

To achieve these and other advantages and in accordance with the purpose(s) of the present invention as embodied and broadly described herein, a method for indexing high-dimensional data using a signature file in a filtering-based indexing scheme in accordance with an aspect of the present invention includes: receiving information related to index generation, the information including a feature vector of high-dimensional data, an object identifier, a first-level signature file identifier, and a second-level signature file identifier; generating a feature vector file containing the feature vector and the object identifier; obtaining a first-level signature from the feature vector, and storing the obtained first-level signature in a first-level signature file; and obtaining a second-level signature by using the first-level signature and the feature vector, and storing the obtained second-level signature in a second-level signature file.

To achieve these and other advantages and in accordance with the purpose(s) of the present invention as embodied and broadly described herein, method for searching high-dimensional data using a signature file in a filtering-based indexing scheme in accordance with an aspect of the present invention includes: receiving searching input information, including a query feature vector, a feature vector file identifier, a first-level signature file identifier, and a second-level signature file identifier; calculating a first-level query signature and a second-level query signature by using the query feature vector; calculating a similarity between a second-level signature file and the second-level query signature; performing a first filtering operation to obtain a primary candidate cell group containing one or more signatures having a high similarity to the second-level query signature; calculating a similarity between a first-level signature file and the first-level query signature by using first-level signature entry identifier information contained in the primary candidate cell group; performing a secondary filtering operation to obtain a secondary candidate cell group containing one or more signatures having a high similarity to the first-level query signature; and obtaining a searching result by calculating a similarity between an entry feature vector and a query feature vector of the secondary candidate cell group, and returning the obtained searched result.

To achieve these and other advantages and in accordance with the purpose(s) of the present invention as embodied and broadly described herein, a method for calculating a corrected query signature ($S_i^c$) in a filtering-based indexing scheme in accordance with an aspect of the present invention includes: (a) calculating a correction value (cv); (b) calculating a first signature ($U(S_i)$) where the correction value (cv) is added, and a second signature ($L(S_i)$) where the correction value (cv) is subtracted; (c) comparing the first signature ($U(S_i)$) with the second signature ($L(S_i)$); and (d) setting the first signature ($U(S_i)$) as a corrected signature value when the first signature ($U(S_i)$) and the second signature ($L(S_i)$) are equal to each other, and setting the first signature ($U(S_i)$) and the second signature ($L(S_i)$) as a corrected signature value when the first signature ($U(S_i)$) and the second signature ($L(S_i)$) are different from each other.

To achieve these and other advantages and in accordance with the purpose(s) of the present invention, a system for searching high-dimensional data using a signature file in a filtering-based indexing system in accordance with another aspect of the present invention includes: a feature vector extracting means for extracting a feature vector from a multimedia object; an object storing means for storing the multimedia object in a database and converting an object identifier; an indexing generating means for generating an index using the feature vector extracted by the feature vector extracting means; a searching means for searching the stored object by using a query feature vector that is extracted from the multimedia object by the feature vector extracting means; and a storing means for storing the multimedia object received from the object storing means, and searching an object in cooperation with the index generating means and the searching means.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 7 is a schematic diagram illustrating the generation of the corrected query signature according to an embodiment of the present invention.

DETAILED DESCRIPTION OF EMBODIMENTS

Hereinafter, specific embodiments will be described in detail with reference to the accompanying drawings.

Figure 1:
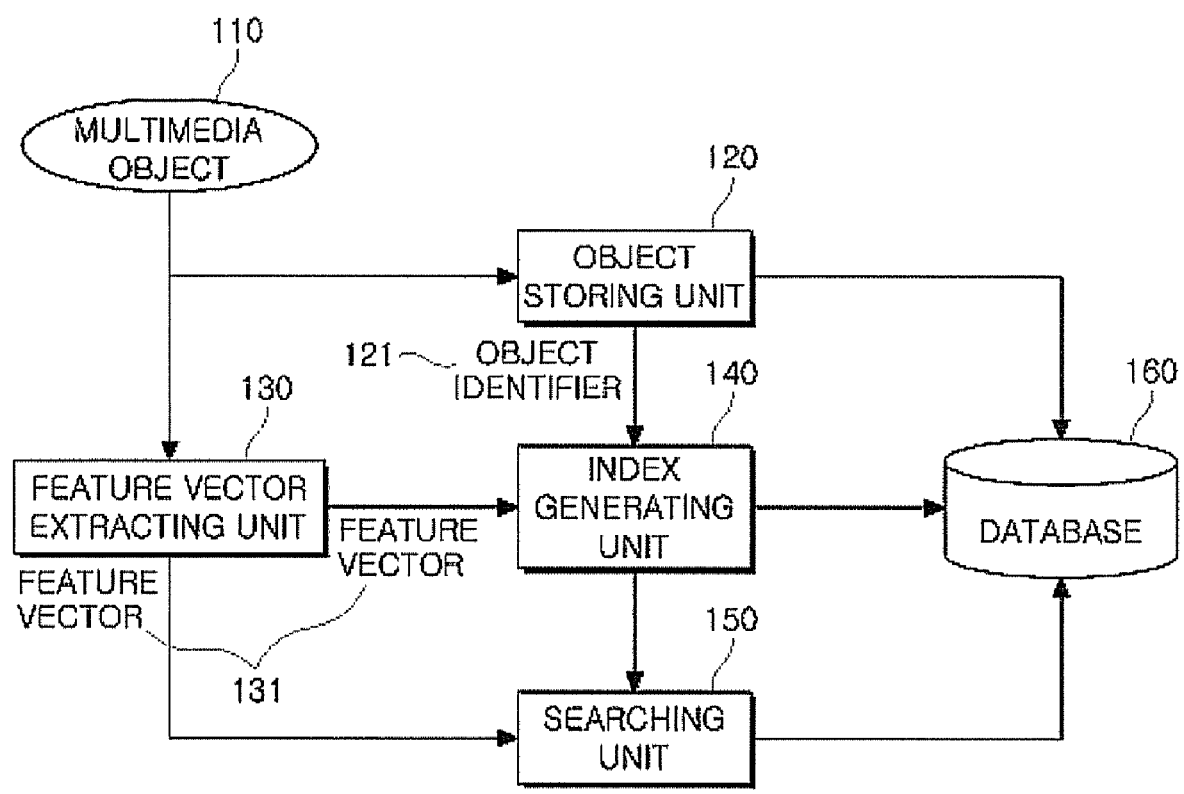
FIG. 1 is a block diagram of a high-dimensional indexing system according to an embodiment of the present invention.

FIG. 1 is a block diagram of a high-dimensional indexing system according to an embodiment of the present invention.

Referring to FIG. 1, the high-dimensional indexing system according to the embodiment of the present invention includes an object storing unit 120, a feature vector extracting unit 130, an index generating unit 140, and a searching unit 150. The object storing unit 120 stores a multimedia object 110 in a database 160 and returns an object identifier 121. The feature vector extracting unit 130 extracts a feature vector 131 from the multimedia object 110. The index generating unit 140 generates an index by using the object identifier 121 and the feature vector 131. At this point, the object identifier 121 that can identify the multimedia object is output from the object storing unit 120 after the object storing unit 120 stores the object in the database 160, and the feature vector 131 is extracted by the feature vector extracting unit 130. The searching unit 150 searches a similar object stored in the database 160 by using the feature vector 131, which is extracted by the feature vector extracting unit 130 from the multimedia object 110 input by a user.

Figure 2:
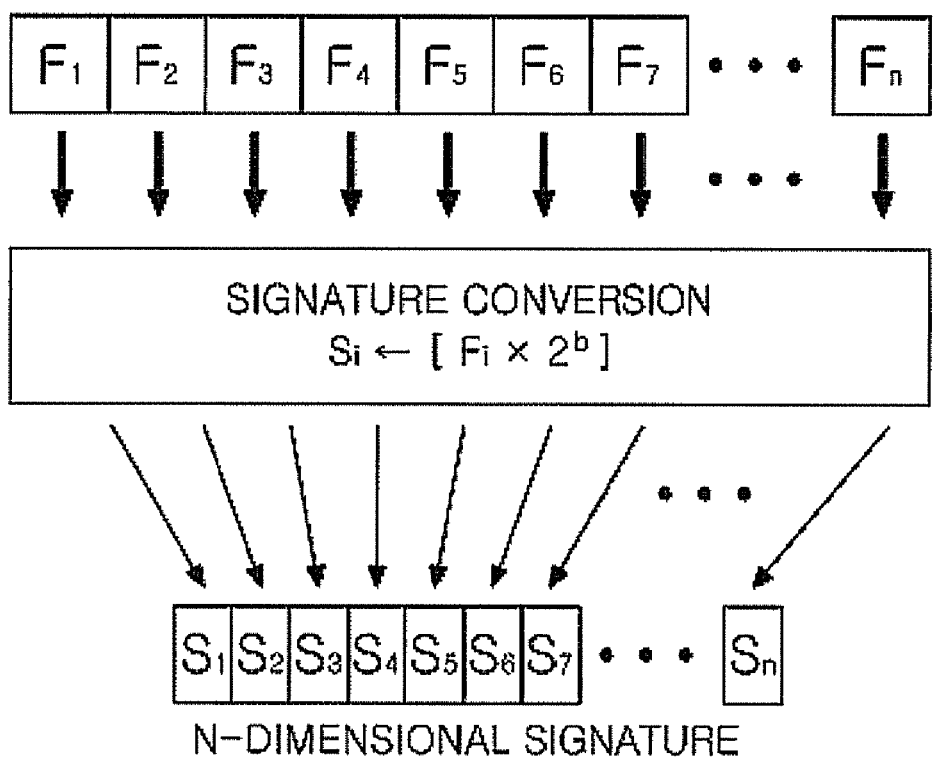
FIG. 2 is a schematic diagram illustrating a process of converting N-dimensional vectors into signatures according to an embodiment of the present invention.

FIG. 2 is a schematic diagram illustrating a process of converting N-dimensional vectors into signatures according to an embodiment of the present invention.

The signature means that a specific cell among several partitions defined by dividing a space is represented in a combination of "0" and "1" to uniquely identify the specific cell.

In a filtering-based index, a data space is divided into several cells, each of which is represented with a signature in order to optimize the use of memory. At this point, a feature vector representing the feature of a multimedia object on a high-dimensional space is converted into a signature of a cell containing the feature vector and then stored.

To convert the N-dimensional feature vectors into b-bit signatures in each dimension, each dimensional feature vector must be converted using the following equation (1)

$$S = [F_i \times 2^b] \quad (1)$$

where $F_i$ is an i-th dimensional feature vector value ($0.0 \leq F_i < 1.0$), $S_i$ is a signature for the i-th dimensional feature vector, b is the bit number of the signature, which is allocated to each dimension of the feature vector, and [X] denotes rounding down X below a decimal place.

When the N-dimensional feature vector is converted into the b-bit signature in each dimension, a total signature is represented with b×N bits. For example, when the bit number (b) of the signature is 4, it can be learned that 5-dimensional feature vectors (0.124, 0.314, 0.5, 0.435) are converted into 20-bit signature (0001 0101 0101 1000 0110).

Figure 3:
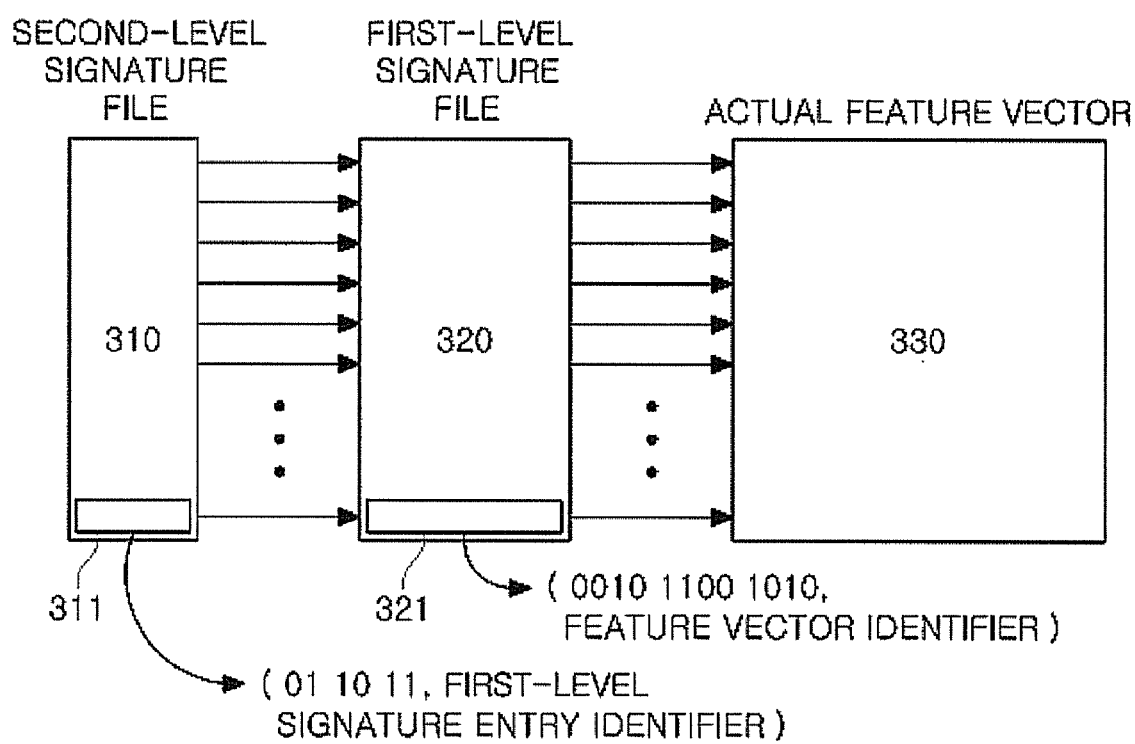
FIG. 3 is a block diagram illustrating a filtering-based index using a 2-level signature file according to an embodiment of the present invention.

FIG. 3 is a block diagram illustrating a filtering-based index using a 2-level signature file according to an embodiment of the present invention.

The filtering-based index according to the embodiment of the present invention includes a first-level signature file 320 and a second-level signature file 310. The second-level signature file 310 has a signature value that is further abstracted than the first-level signature file 310.

For example, when the first-level signature is represented with 8 bits, the second-level signature is represented with 4 bits. Entries 321 contained in the first-level signature file 320 have signature values of actual feature vectors and actual feature vector identifier values.

Entries 311 contained in the second-level signature file 310 indicate the signature with a small bit number of a feature vector and signature entries with respect to the same feature vector of the first-level signature file.

Figure 4:
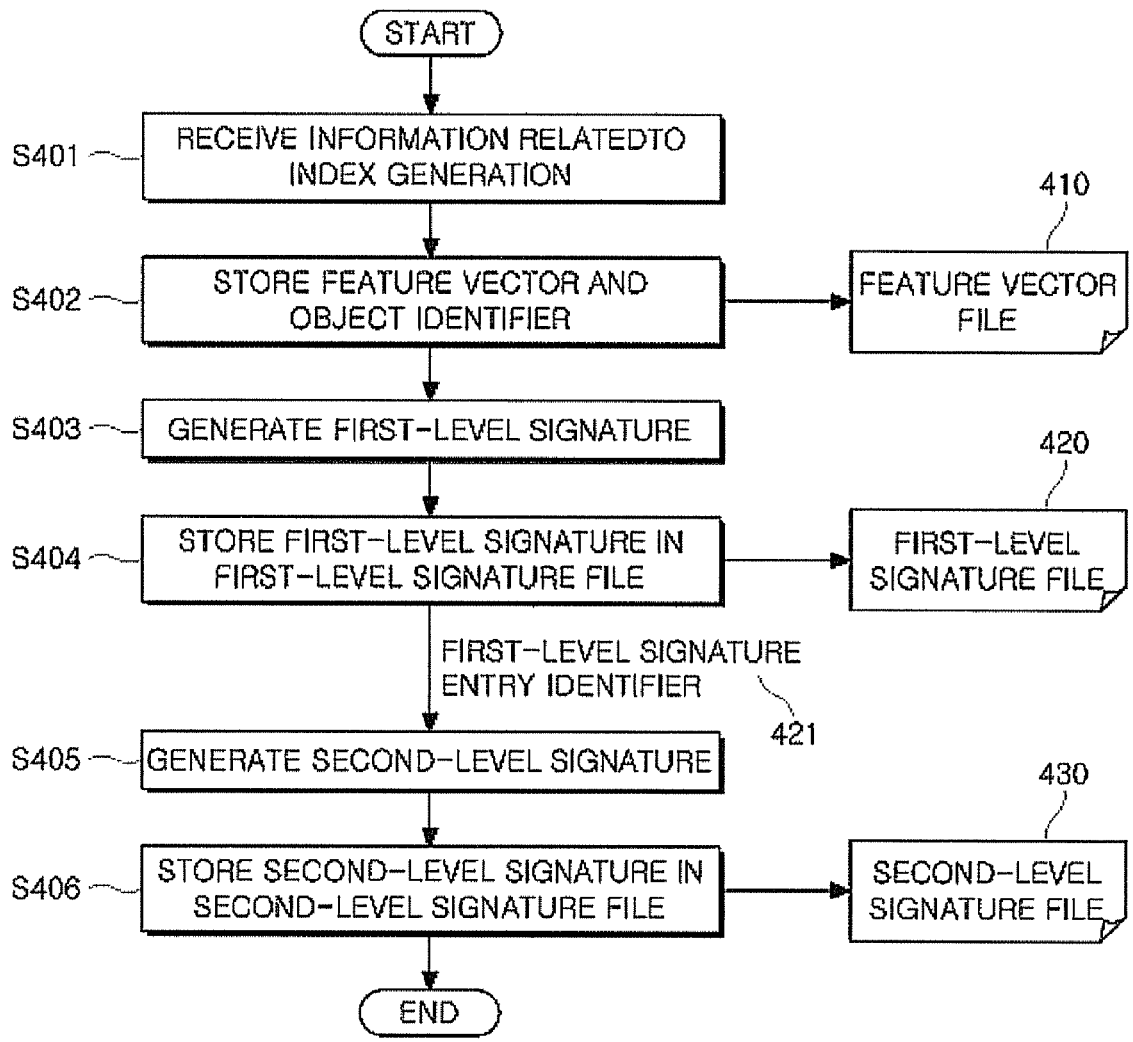
FIG. 4 is a flowchart illustrating a high-dimensional data indexing method using a 2-level signature file according to an embodiment of the present invention.

FIG. 4 is a flowchart illustrating a high-dimensional data indexing method using a 2-level signature file according to an embodiment of the present invention.

Referring to FIG. 4, information related to index generation, which include information such as a feature vector, an object identifier, a first-level signature file identifier, and a second-level signature file identifier, is received for generating index of high-dimensional data in operation S401.

In operation S402, the feature vector 131, which is extracted by the feature vector extracting unit 130, and the object identifier 121, which is generated from the multimedia object 110 by the object storing unit 120, are stored in a feature vector file 410. The first-level signature is generated from the feature vector 131 in operation S403, and the generated first-level signature is stored in a first-level signature file 420 in operation S404. It is preferable that a method for generating the signature from the feature vector 131 is performed using the embodiment of FIG. 2.

In operation S405, a second-level signature with fewer bits than the first-level signature is generated using the feature vector 131 and the first-level signature entry identifier 421. In operation S406, the generated second-level signature is stored in a second-level signature file 430.

Operations S401 through S406 are performed for each entry of the feature vector 131.

Figure 5:
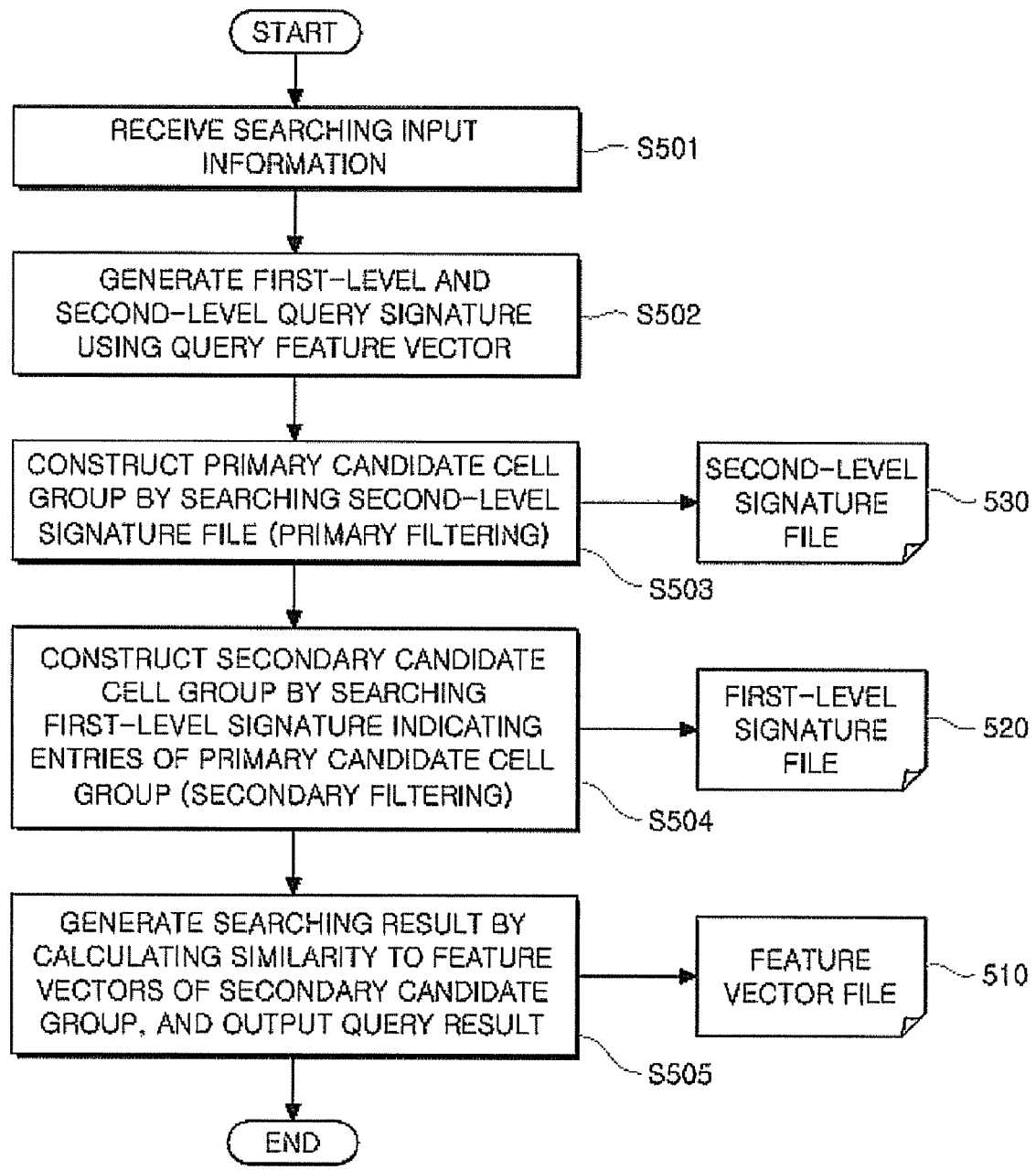
FIG. 5 is a flowchart illustrating a searching method using a 2-level signature file according to an embodiment of the present invention.

FIG. 5 is a flowchart illustrating a searching method using a 2-level signature file according to an embodiment of the present invention.

The searching method according to the embodiment of the present invention reduces data contained in the query result twice by using the 2-level signature, and generates a final query result.

Referring to FIG. 5, searching input information is received for searching an object similar to a multimedia object input by a user in operation S501. The searching input information includes a user query feature vector extracted from the multimedia object queried by the user, a feature vector file identifier, a first-level signature file identifier, and a second-level signature file identifier.

In operation S502, a first-level query signature and a second-level query signature are generated using the received user query feature vector. In operation S503, a primary filtering is performed to calculate a similarity to the second-level query signature while searching a second-level signature file with the generated second-level query signature, and to construct a primary candidate cell group having high-similarity signatures. The second-level signature file can be preferably searched using a sequential searching, but other searching schemes can also be used.

When a k-nearest query is applied, all signatures intended to be found may not be contained because the searching using the signature is to find the similar signature from the abstracted information. So as to these disadvantage, it is preferable to construct 2×k or 4×k candidate cell groups so that all signatures intended to be found can be contained.

In operation S504, a secondary filtering is performed to calculate a similarity to the first-level query signature using the identifier information of the 1-level signature entry contained in the primary candidate cell group, and to construct a secondary candidate cell group having high-similarity signatures.

In the case of the k-nearest query, the second-level candidate cell group is appropriately increased and constructed to be 1.5×k or 2×k in order to correct problems caused by the use of the abstracted information in calculating the second-level candidate cell group.

In operation S505, a searching result is generated by calculating the similarity using the feature vector and the query feature vector indicated by the entry of the secondary candidate cell group, and a query result is output.

In the case of the range query, the candidate cell group is calculated by increasing the range value, likewise the k-nearest query, and the range is strictly applied to the comparison with the actual feature vector.

Since the signature is the abstracted information, the searching using the signature may cause a "false hit", in which false data are contained in the searching result, or a "miss hit", in which desired data is not contained in the searching result. Consequently, the accuracy may be lowered.

As described above, in order to improve the accuracy, more signatures than must be searched are contained in the candidate groups upon searching the signatures. That is, the correction is performed by increasing the number of the searching.

In addition to the correction using the increase of the number of the searching, the accuracy can be improved by the query correction, that is, by generating a plurality of signatures for the query feature vector. Upon generating the query signature, the query correction makes the feature vector have two signature values when the feature vector is placed near to a boundary of the signature value. This process will be described below in detail with reference to FIG. 6.

Figure 6:
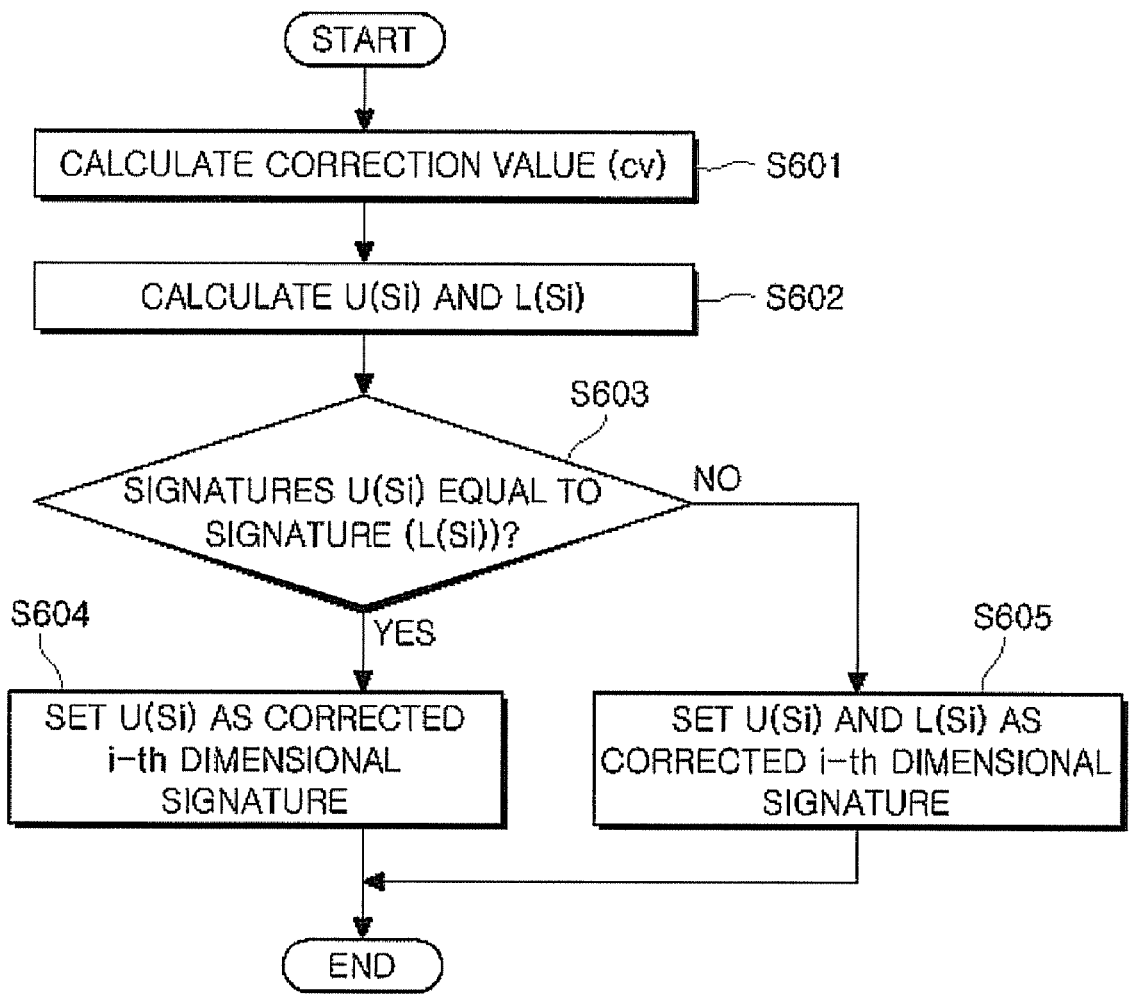
FIG. 6 is a flowchart illustrating a method for generating a corrected query signature.

FIG. 6 is a flowchart illustrating a method for generating a corrected query signature.

Referring to FIG. 6, a correction value cv for correcting the signature value is calculated using the following equation (2) in operation S601.

$$cv = \frac{1}{2^b} \times c \qquad (2)$$

where b is bit number of the signature, and c is a correction constant.

In the equation (2), the correction constant c is greater than 0 and less than or equal to 0.5. The correction constant c is different according to applications. That is, the correction constant c is obtained by a learning.

In operation S602, after calculating the correction value (cv), a signature $U(S_i)$ is calculated by adding an i-th dimensional value of the query feature vector to the correction value cv, as expressed in the following equation (3). Then, a signature $L(S_i)$ is calculated by subtracting the correction value cv from the i-th dimensional value of the query feature vector, as expressed in the following equation (4).

$$U(S_i) = [F_i \times 2^b + cv] \qquad (3)$$

$$L(S_i) = [F_i \times 2^b - cv] \qquad (4)$$

If the feature vector is placed near the boundary, the signature $U(S_i)$ is different from the signature $L(S_i)$. If the feature vector is not placed near the boundary, the signature $U(S_i)$ is equal to the signature $L(S_i)$. In operation S603, the two signature values are compared to determine whether the feature vector is placed near the boundary.

In operation S604, when the two signature values are equal to each other, the feature vector is not placed near the boundary and thus the signature $U(S_i)$ is set as the corrected query signature value of the i-th dimension of the query feature vector.

In operation S605, when the two signature values are different from each other, both the signature $U(S_i)$ and the signature $L(SI)$ are set as the corrected query signature value of the i-th dimension of the query feature vector.

As described above, after calculating the corrected signatures $S_i^c$ of each dimension, the signature of the query feature vector is generated using the corrected signatures $S_i^c$. For the values placed near the boundary, if one or more dimensions have two corrected signature values, two or more query signatures corrected with respect to the query feature vector are generated with different signature values in the corresponding dimension.

FIG. 7 is a schematic diagram illustrating the generation of the corrected query signature according to an embodiment of the present invention.

Assuming that there exists a 5-dimensional feature vector (0.124, 0.352, 0.314, 0.5, 0.435), a signature $S_i$ (0001 0101 0101 1000 0110) is extracted from the signature extraction equation (1).

By applying 0.2 as the correction value, the signature $S_i$ is corrected using the equations (2), (3) and (4).

That is, a signature $U(S_i)$ (0001 0101 0101 1000 0110) and a signature $L(S_i)$ (0001 0101 0101 0111 0110) can be calculated based on the signature $S_i$ (0001 0101 0101 0111 0110).

As the correction result, the signature $U(S_i)$ and the signature $L(S_i)$ have the same values in the first, second, third and fifth dimensions. However, in the fourth dimensional feature vector, the signature $U(S_i)$ and the signature $L(S_i)$ are 1000 and 0111, respectively. That is, the signature $U(S_i)$ and the signature $L(S_i)$ are different from each other. This is because the fourth dimensional feature vector value of 0.5 is near the boundary for signature.

When the two signatures $U(S_i)$ and $L(S_i)$ for correction of a specific dimensional feature vector are different from each other, the signature for the query feature vector is generated with two signature values in the corresponding dimension.

The example of FIG. 7 shows two corrected query signatures with different signature values in the fourth dimension, that is, (0001 0101 0101 0111 0110) and (0001 0101 0101 1000 0110).

The searching method using the corrected query signature is identical to the above-described method of FIG. 5. However, after generating the corrected query signature, the signature file searching is performed on the corrected query signatures in operations S503 and S504. After obtaining the respective candidate cell groups, union is performed on the groups to contain them in the query result candidate cell group.

When there are many corrected query signatures, time necessary to search the query signature much increases. Therefore, it is preferable to use the number correction method rather than the query signature correction method. Furthermore, the use of both the number correction method and the query signature correction method can increase the accuracy of the searching result.

It will be apparent that the method for generating the corrected query signature and the searching method using the corrected query signature can be all applied to the indexing structure and the high-dimensional data indexing apparatus and method based on the abstracted information using the signature.

According to the embodiments of the present invention, since the high-dimensional indexing structure using the 2-level signature file is used, the data read is similar to the indexing using a signature with a small number of bits and it is possible to obtain an effect similar to the indexing using a signature with a large number of bits.

Furthermore, since the signature is used for the index for high-dimensional data, the searching method can increase the searching accuracy by using the enhanced signature for the query feature vector.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for indexing high-dimensional data using a signature file in a filtering-based indexing scheme for a multimedia system, the method comprising:

receiving information related to index generation, the information including a feature vector of high-dimensional data, an object identifier, a first-level signature file identifier, and a second-level signature file identifier;

generating a feature vector file containing the feature vector and the object identifier;

obtaining a first-level signature from the feature vector, and storing the obtained first-level signature in a first-level signature file in a database of the multimedia system; and obtaining a second-level signature by using the first-level signature and the feature vector, and storing the obtained second-level signature in a second-level signature file.

2. A method for searching high-dimensional data using a signature file in a filtering-based indexing scheme for a multimedia system, the method comprising:

receiving searching input information by the system, including a query feature vector, a feature vector file identifier, a first-level signature file identifier, and a second-level signature file identifier;

calculating a first-level query signature by using the query feature vector and a second-level query signature by using the query feature vector and the calculated first-level query signature;

calculating a similarity between a second-level signature file and the second-level query signature;

performing a first filtering operation to obtain a primary candidate cell group containing one or more signatures having a high similarity to the second-level query signature;

calculating a similarity between a first-level signature file and the first-level query signature by using first-level signature entry identifier information contained in the primary candidate cell group;

performing a secondary filtering operation to obtain a secondary candidate cell group containing one or more signatures having a high similarity to the first-level query signature; and obtaining a searching result by calculating a similarity between an entry feature vector and a query feature vector of the secondary candidate cell group, and returning the obtained searched result and storing the result to a feature vector file of the multimedia system.

3. A method for calculating a corrected query signature $(S_i^c)$ in a filtering-based indexing scheme for a multimedia system, the method comprising:

calculating a correction value (cv);

calculating a first signature $(U(S_i))$ where the correction value (cv) is added and storing the calculated the first signature first to a first-level signature file in the multimedia system, and a second signature $(L(S_i))$ where the correction value (cv) is subtracted and storing the calculated the first signature first to a first-level signature file in the multimedia system;

comparing the first signature $(U(S_i))$ with the second signature $(L(S_i))$; and setting the first signature $(U(S_i))$ as a corrected signature value when the first signature $(U(S_i))$ and the second signature $(L(S_i))$ are equal to each other, and setting the first signature $(U(S_i))$ and the second signature $(L(S_i))$ as a corrected signature value when the first signature $(U(S_i))$ and the second signature $(L(S_i))$ are different from each other.

4. The method of claim 3, wherein the calculating the correction value (cv) using the following equation $$cv = \frac{1}{2^b} \times c$$

where b is bit number of the signature, and c is a correction constant.

5. The method of claim 3, wherein the calculating the first signature (U(Si)) using the following equation $$U(S_i)=[F_i \times 2^b+cv]$$

where Fi is a feature vector value of an i-th dimension, b is bit number of the signature, cv is the correction value, and [X] denotes rounding down X below a decimal place.

6. The method of claim 3, wherein the calculating the second signature (L(Si)) using the following equation $$L(S_i)=[F_i \times 2^b-cv]$$

where Fi is a feature vector value of an i-th dimension, b is bit number of the signature, cv is the correction value, and [X] denotes rounding down X below a decimal place.

7. A method for searching high-dimensional data using a corrected query signature in a filtering-based indexing scheme for a multimedia system, the method comprising:
receiving searching input information, including a query feature vector, a feature vector file identifier, a first-level signature file identifier, and a second-level signature file identifier;
calculating a corrected first-level query signature and a corrected second-level query signature using the query feature vector, as in the method of any one of claims 3 through 6 for calculating the corrected signature value;
performing a primary filtering operation to obtain a candidate cell group by searching signature files with respect to the corrected second-level query signature, and obtain a candidate cell group by union of the obtained candidate cell group and storing a result to a second-level signature file of the multimedia system;
performing a secondary filtering operation to construct a secondary candidate cell group containing signatures with a high similarity to the corrected first-level query signature in a first-level signature file by using first-level signature entry identifier information contained in the primary candidate cell group and storing a result to a first-level signature file of the multimedia system; and
obtaining a searching result by calculating a similarity between an entry feature vector and a query feature vector of the secondary candidate cell group, and returning the obtained searching result and storing the obtained search to a feature vector file of the multimedia system.

8. A system for searching high-dimensional data using a signature file in a filtering-based indexing system, the system comprising:
a feature vector extracting unit to extract a feature vector from a multimedia object;
an object storing unit to store the multimedia object in a database of the system and converting an object identifier;
an indexing generating unit to generate an index using the feature vector extracted by the feature vector extracting unit;
a searching unit to search the stored object by using a query feature vector that is extracted from the multimedia object by the feature vector extracting unit; and
a storing unit to store the multimedia object received from the object storing unit, and searching an object in cooperation with the index generating unit and the searching unit.

9. The system of claim 8, wherein the indexing generating unit generates a feature vector file containing an object identifier, which is received from the object storing unit, and a feature vector, which is extracted by the feature vector extracting unit; and
the indexing generating unit calculates a first-level signature from the feature vector and stores the calculated first-level signature in a first-level signature file; and
the indexing generating unit calculates a second-level signature by using the first-level signature and the feature vector and stores the calculated second-level signature in a second-level signature file.

10. The system of claim 8, wherein the searching unit calculates a first-level query signature and a second-level query signature by using a query feature vector;
the searching unit performs a primary filtering operation to search the second-level signature file to obtain a primary candidate cell group having signatures with a high similarity to the second-level query signature; and
the searching unit performs a secondary filtering operation to obtain a secondary candidate cell group having signatures with a high similarity to the first-level query signature in the first-level signature file by using first-level signature information contained in the primary candidate cell group.

* * * * *